May 28, 1968  R. J. DE VRIES  3,385,029
COOLING AND SEPARATING REACTIVE GAS FROM DISPERSED
SOLID OR MOLTEN PARTICLES
Filed March 30, 1966

INVENTOR:
RICHARD J. DE VRIES
BY:
HIS ATTORNEY

United States Patent Office 3,385,029
Patented May 28, 1968

3,385,029
COOLING AND SEPARATING REACTIVE GAS FROM DISPERSED SOLID OR MOLTEN PARTICLES
Richard J. de Vries, Amsterdam, Netherlands, assignor to Shell Oil Company, New York, N.Y., a corporation of Delaware
Filed Mar. 30, 1966, Ser. No. 538,826
Claims priority, application Netherlands, Apr. 12, 1965, 65—4,620
1 Claim. (Cl. 55—59)

ABSTRACT OF THE DISCLOSURE

Hot reactive gases are separated from mixtures thereof with finely dispersed particles, such as are obtained by iodinative dehydrogenation of hydrocarbons at an elevated tempertaure, e.g. 550° C., in the presence of solid or molten particles containing metal compounds, e.g. certain metal oxides or hydroxides, such as lithium hydroxide, which are capable of binding hydrogen iodide, by passing the hot mixture at high velocity through an essentially unobstructed cyclone separator while injecting atomized water into the cyclone separation zone at a point at which most of the solid or molten particles have already been separated from the gas, generally where the gas has completed three-quarter of a turn from its direction of entry into the cyclone, with the amount of water being sufficient to be essentially completely vaporized by the hot gas while cooling the hot gas to a temperature no higher than about 450° C., and without condensing any of the gas, without subjecting any appreciable proportion of the solid or molten particles to direct contact with liquid water.

---

Figure 1:
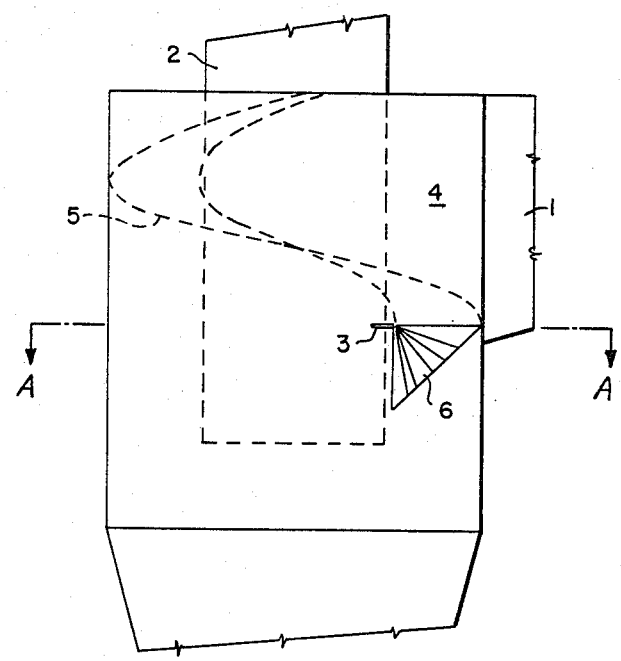
Figure 2:
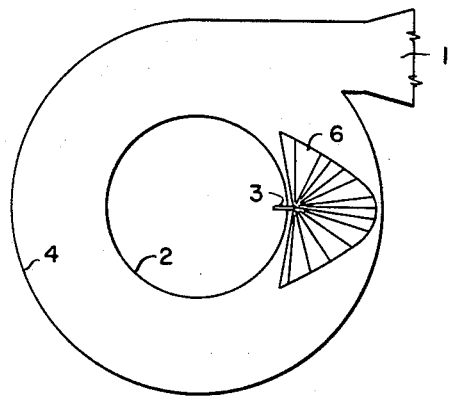

This invention relates to a process for the cooling and separating of hot, reactive gas from finely divided particles with the aid of a cooling liquid, the gas being passed through a cyclone for separating the particles from the gas.

In technical practice it is often necessary for a gas stream containing condensed particles, solid or liquid, to be cooled as rapidly as possible. This applies to, for instance, a gas stream which leaves a reaction zone and which then has to be brought to a lower temperature as rapidly as possible in order to suppress undesirable chemical reactions. The condensed particles may be catalysts, particles for the supply of discharge of heat, reagents or products formed. In such a case it is desirable to perform the cooling process without cooling the condensed particles, since this calls for a larger quantity of cooling liquid.

The U.S. Patent No. 2,698,672 describes an apparatus where the cooling liquid is prevented from contacting the solid particles. This apparatus is a cyclone where cooling liquid is injected into the gas outlet tube. Consequently, cooling of the gas takes place after the mixture of gas and solid particles has passed the separation zone of the cyclone and the gas has entered the gas outlet tube. The cooling of a gas stream according to the aforementioned state of the art often is insufficiently effective, especially of reactive gases.

The present invention provides a process which enables very rapid cooling of such a gas stream to be effected. It will be described with reference to the accompanying drawing, wherein FIG. I is a front elevational view of a modified cyclone for effecting the cooling and separation, and FIG. II is a sectional view along A—A of FIG. I.

According to the invention the cooling liquid is atomized in the separation zone as close to the cyclone inlet as possible, but in such a way that the liquid is entirely or substantially evaporated in that part of the separation zone where the greater part of the condensed particles has already been separated. Thus, the cooling of the gas takes place while the gas is still in the separation zone of the cyclone, and after a minimum residence time of the gas therein. The cooling liquid, for example water, is, after having been divided into droplets, passed into the separation zone of the cyclone as soon as the chance of a condensed particle being hit is thought to be acceptably small. Besides, precautions are taken, for instance by appropriate choice of the degree of atomization, by which it is ensured that the liquid is entirely or substantially evaporated during the contact with the gas that has largely been freed from condensed particles. Thus no liquid will strike against the wall of a cyclone on which condensed particles are present. It is clear that in this manner the heat of heating up and of vaporization of the total quantity of cooling liquid introduced is almost exclusively used for cooling the gas. This results in an economical use of cooling liquid. Another result is that, in the case of solid particles sticking or agglomeration of them by liquid is avoided. Nor can the condensed material, whether solid or molten, disintegrate into smaller particles by thermal shock, since abrupt cooling due to contact with liquid is not possible. Disintegration into small particles may be disadvantageous, for example, if the resultant particles are so small that they can no longer be separated by the cyclone. Cooling of hot molten material could be troublesome because of undesirable solidification.

A satisfactory operation is obtained by introducing the cooling liquid into the cyclone in a direction that is approximately perpendicular to the direction of flow of the gas. When doing so it is of importance that the liquid droplets are distributed as uniformly as possible over the cross-sectional area of the cyclone. The cooling liquid can be introduced via the outermost cylindrical wall of the cyclone, via the upper side, via the outlet tube, or via combinations thereof.

The liquid is preferably atomized with the aid of one or more atomizers in such a way that a zone of liquid droplets is formed of which the boundary surface being closest to the cyclone inlet approximately coincides, with a plane in which the concentration of solids matter is not higher than a specific low value. In the process of condensed particles being separated from a gas in a cyclone, the gas follows a helical path through the cyclone and the condensed particles at the same time move towards the outer wall of the cyclone. In a stationary process, zones with equal concentrations of condensed particles have the form of a plane which develops helically towards the outer wall of the cyclone. It is desirable that a screen of liquid droplets should be present there where that concentration does not exceed a specific low value. The magnitude of that concentration is determined in each case separately.

The process according to the invention can be used to advantage for quenching the reaction mixture which is passed from the dehydrogenation zone to a cyclone in a process for the dehydrogenation of hydrocarbons by reaction with iodine in the presence of solid or molten particles containing metal compounds which are capable of binding hydrogen iodide, in which cyclone the solid or molten particles are separated from the reaction mixture; see G. G. Baijle et al., U.S. 3,130,241, Apr. 21, 1964.

The reaction mixture which in this process leaves the dehydrogenation zone has a temperature of about 550° C. In order to suppress undesirable secondary reactions, mainly concerning olefins and diolefins, the gas has to be cooled to at least about 450° C. as soon as possible after it has left the reaction zone. However, in view of the loss of cooling liquid and the deleterious effect of cooling liquid on dispersed solid and molten particles, the gas may not be cooled until the greater part of the solid and/or molten particles have been separated. Besides, it is of vital importance in this case to avoid disintegration of condensed particles due to thermal shock, since the condensed particles have bound hydrogen iodide. The formation of smaller particles which are no longer separated by the cyclone leads to loss of iodine, which increases the cost of the dehydrogenation process very considerably. In the large cyclones required for commercial plants the residence time of the gas is already so long that, when the gas is quenched only after leaving the separation zone, the undesirable secondary reactions already have advanced too far. Quenching according to the invention in the separation zone, therefore, offers considerable advantages.

In designing a cyclone suitable for carrying out the process according to the invention, account will be taken of the conditions and requirements applying to a specific case, as will be apparent to the person skilled in the field of cyclones.

*Example*

Referring to the drawing, the figures present a front view and a cross-section of a cyclone provided with an atomizer for cooling liquid. The inlet tube 1 has an elongated section. In the vicinity of the outside circumference of the gas outlet tube 2 an atomizer 3 is located, which is connected to a water line in a manner not further specified. In the separation zone 4 the gas stream containing solid particles follows a helical path indicated by 5. In this example the atomizer 3 is located at a point of the separation zone where the gas has completed three quarters of a turn, i.e. about 270° from the direction of entry. In this case this is the location where the concentration of condensed particulate matter is sufficiently low. The atomizer gives a conical screen of water droplets 6. The droplets do not reach the outer wall of the separation zone.

Into such a cyclone with a diameter of the separation zone of 3.5 meters, at a pressure of 1.5 kg./cm.$^2$ abs. gas is introduced at a rate of 15 meters/sec. Forty-four tons of gas per hour are introduced. The gas contains olefins and diolefins and originates from the dehydrogenation stage of a process for the dehydrogenation of hydrocarbons by reaction with iodine in the presence of dispersed finely divided solid particles containing metal compounds which are capable of binding hydrogen iodide. In the cyclone, the solid particles have to be separated from the gas stream. The temperature at the inlet of the cyclone is at 530° C. Together with the gas, 2000 tons of solids are introduced per hour. The atomizer atomizes 2.4 tons of water per hour. The maximum water droplets size amounts to 280 microns.

In the cyclone the temperature of the gas drops by 100° C. The solid particles are separated to the extent of 99.4%. At the location where water is introduced the concentration of solid particles amounts to 0.6% of the quantity introduced, so that the particles separated by the cyclone are not hit by water.

Cooling of the gas to 430° C. takes place within a residence time of the gas in the cyclone of 0.6 second, which is sufficiently rapid to suppress secondary reactions in the olefin-containing gas.

The same method is effective for prequenching and separating a similar hot iodatively dehydrogenated olefin and diolefin-containing gas from finely dispersed molten particles of metal iodide, such as molten lithium iodide, which may contain a small proportion of lithium hydroxide.

I claim as my invention:

1. Process of quenching and separating a hot reactive gas initially at a temperature of about 550° C. from a greater mass proportion of finely dispersed particles therein, wherein the hot gas is the reaction mixture resulting directly from the dehydrogenation of hydrocarbons by reaction with iodine in the presence of dispersed solid or molten particles containing metal compounds which are capable of binding hydrogen iodide at a temperature of about 550° C., without condensation of the hot gas, by passing the mixture at high velocity through a cyclone for separating the particles from the gas while injecting atomized water into the separation zone of the cyclone at a point therein where the gas has completed three-quarter of a turn, i.e. about 270° from the direction of entry, at which point only a small fraction of the particles remain to be contacted by the water, and the water is injected in a direction which is approximately perpendicular to the flow of gas thereat, the amount of water injected being sufficient by its complete vaporization to absorb sensible heat from the hot gas to cool the hot gas to a temperature to no higher than about 450° C.

References Cited

UNITED STATES PATENTS

| 1,130,849 | 3/1915 | Seymour | 55—238 |
|---|---|---|---|
| 1,380,951 | 6/1921 | Frankforter | 23—152 |
| 1,961,956 | 6/1934 | Bleibtreu et al. | 55—238 X |
| 2,800,974 | 7/1957 | Gilman et al. | 55—92 X |
| 3,225,523 | 12/1965 | Wiebe | 55—238 X |
| 3,278,266 | 10/1966 | Welch et al. | 23—152 X |
| 2,698,672 | 1/1955 | Burnside et al. | |
| 3,130,241 | 4/1964 | Baijle et al. | 260—677 |

FOREIGN PATENTS 1,081,424  5/1960  Germany.

REUBEN FRIEDMAN, *Primary Examiner.*

J. ADEE, *Assistant Examiner.*